UNITED STATES PATENT OFFICE.

JULIUS EDMUND DOTCH AND EDWARD DUEMPELMANN, OF WASHINGTON, DISTRICT OF COLUMBIA.

IMPROVED COMPOSITION FOR PAVING, ROOFING, AND FOR OTHER PURPOSES.

Specification forming part of Letters Patent No. 90,825, dated June 1, 1869.

*To all whom it may concern:*

Be it known that we, JULIUS EDMUND DOTCH and EDWARD DUEMPELMANN, both of Washington, in the county of Washington and District of Columbia, have invented a new and useful Improvement in Composition for Pavements and Roofing, and for other purposes; and we do hereby declare that the following is a full, clear, and exact description thereof.

Our invention consists in treating bituminous substances, such as asphaltum, grahamite, petroleum residuums, the different mineral resins, wood-tar, coal-tar, Barbadoes tar, and coal-tar pitch, with sulphur alone or in solution, with chloride of sulphur, or with sulphur in combination with the various bases, such as sulphuret of iron, &c.

In combining sulphur with the hydrocarbons, a definite chemical compound is formed, differing from its component parts in many material respects, being harder, tougher, and more capable of resisting heat. The sulphur should be in just sufficient proportion to form this compound, as any excess would mix mechanically with the mass and render it too brittle for use.

Where sulphur is used to effect the change much difficulty is experienced in determining the proportion, as it varies according to the hydrocarbon used. This renders it necessary to determine, by experiment, the proportion with every new sample of hydrocarbon—a course utterly impracticable when large quantities of the composition are to be prepared, in which many different varieties of hydrocarbon will have to be used. To overcome this difficulty, and render the preparation of our composition an easy matter for ordinary workmen, and to avoid all danger of having an excess of sulphur, we add to the mass any of the various metallic oxides, such as litharge, for example, or the metals in a finely-divided state, which combine with any free sulphur, forming metallic sulphurets, which are not objectionable in the composition.

When chloride of sulphur, or sulphur in combination with the metallic bases is used, we find it unnecessary to employ the litharge or other metallic oxides. The chloride of sulphur being volatile, any excess escapes in the form of gas or vapor, and in the case of the metallic sulphurets, the hydrocarbon only combines with its definite proportion of sulphur, leaving any excess of the sulphuret unaltered.

In carrying out our invention, we boil the hydrocarbon until the water is entirely evaporated, and then add the sulphur, chloride of sulphur, or metallic sulphuret. The sulphur may be dissolved in bisulphide of carbon, the ethereal or fatty oils, or may be mixed directly with the mass. To give consistency and hardness to the mass, we add various mineral, metallic, vegetable, or animal substances, such as soap-stone, sawdust, rags, hair, pulverized slate, &c.

In order to render our composition capable of resisting the utmost heat, we coat it sometimes with tungstate of baryta, mixed with drying-oils or other vehicle for paint.

The smooth surface of all concrete pavements is very objectionable, on account of the liability of horses slipping thereon. To obviate this difficulty we pass over the pavement, before it becomes perfectly cool, a corrugated roller, or a roller having a series of flanges or projections around its circumference, which indents the surface, leaving it in the condition of the Nicholson or any other well-paved road.

We apply our composition to the bare ground or to old pavements, such as the ordinary cobble-stone, the wooden pavement, and macadamized or other roads.

Although our composition is mainly designed for roofing and paving, it is capable of being applied to many other useful purposes, such as the manufacture of pipes and tiles, linings for sinks and cisterns, coating for vessels and walls, for laying foundations, and fire-proof floors, for the manufacture of beds for billiard-tables, for the manufacture of coffins, and for other uses too numerous to mention.

Having thus described our invention, what we claim, and desire to secure by Letters Patent, is—

1. The employment of the metallic oxides, such as litharge, or finely-divided metals, &c., to combine with the superfluous sulphur in the treatment of hydrocarbons, for the purpose herein described.

2. The employment of chloride of sulphur, or the combinations of sulphur with the various bases, for the treatment of hydrocarbons, as and for the purposes described.

3. The use of tungstate of baryta, in combination with drying-oils, for coating the composition, as herein described.

4. A concrete pavement having its surface roughened or indented, as herein described.

5. The corrugated roller for indenting the surface of pavements, herein described.

JULIUS EDMUND DOTCH.
EDWARD DUEMPELMANN.

Witnesses:
EDM. F. BROWN,
CHAS. L. COOMBS.